Feb. 6, 1934.  W. OWEN  1,946,356
GLASS CUTTING APPARATUS
Filed April 7, 1933  9 Sheets-Sheet 1
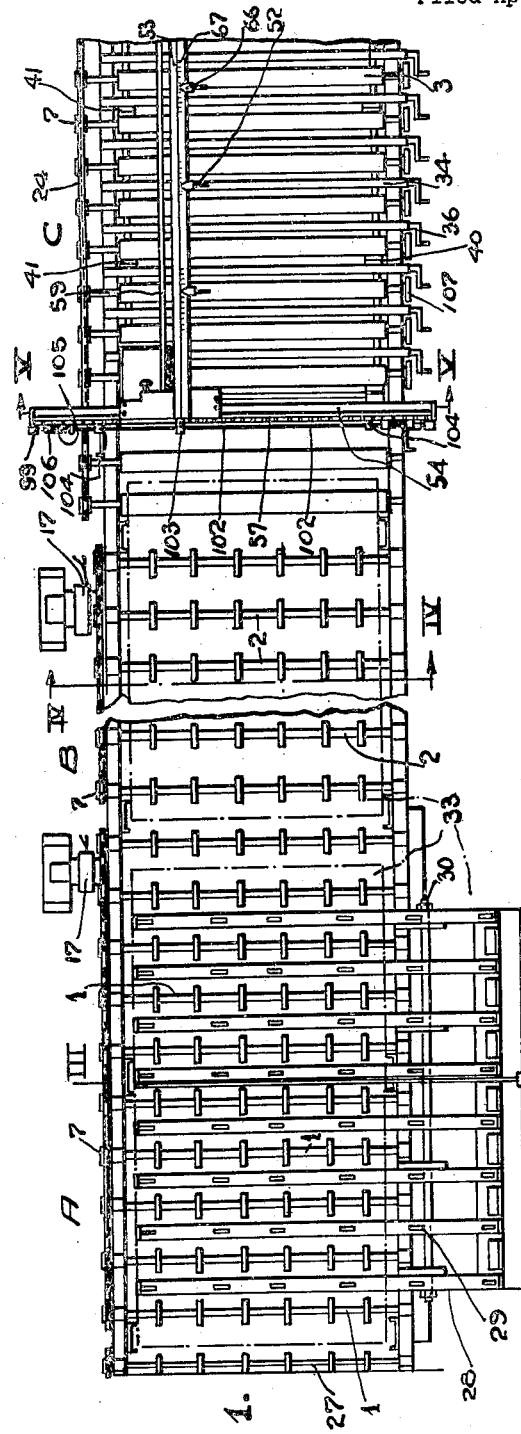
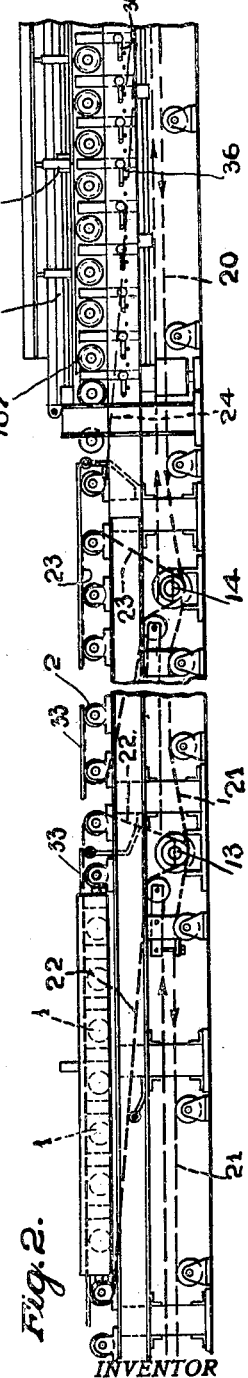
INVENTOR
WILLIAM OWEN
BY
ATTORNEYS Feb. 6, 1934.    W. OWEN    1,946,356
GLASS CUTTING APPARATUS
Filed April 7, 1933    9 Sheets-Sheet 2
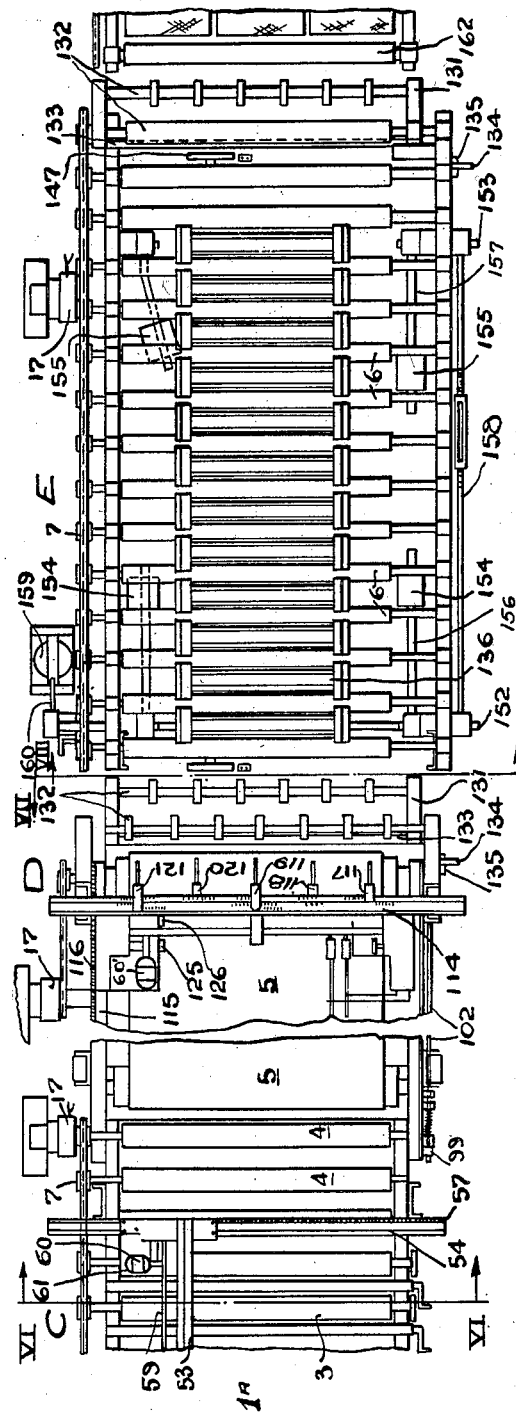
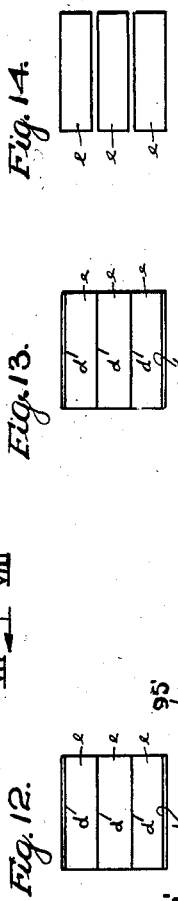
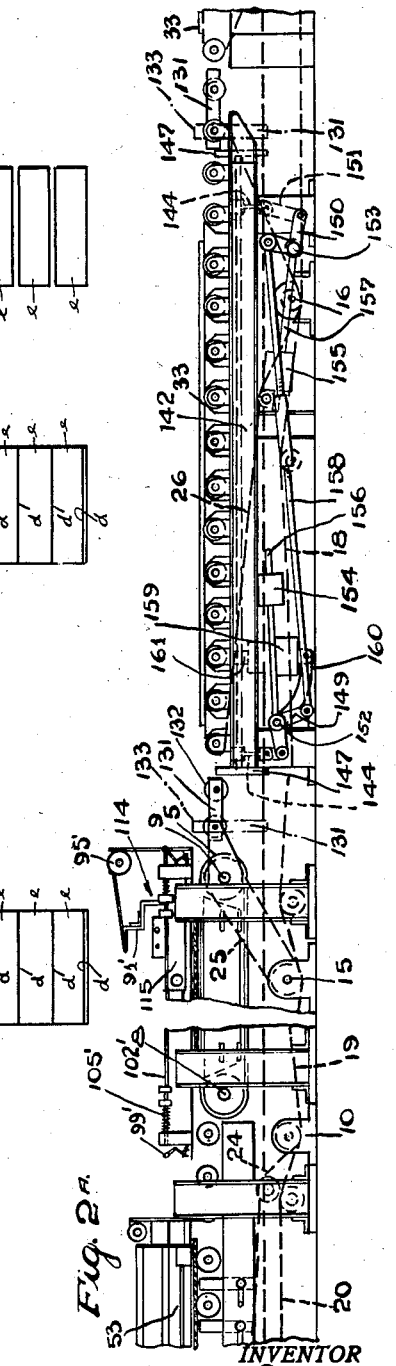
INVENTOR
WILLIAM OWEN
BY Bradley & Bee
ATTORNEYS

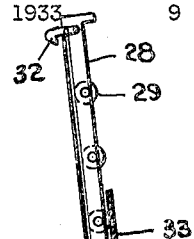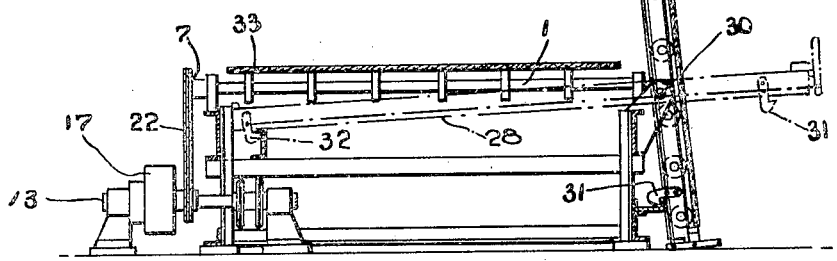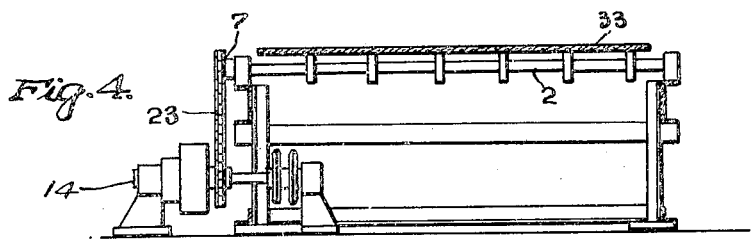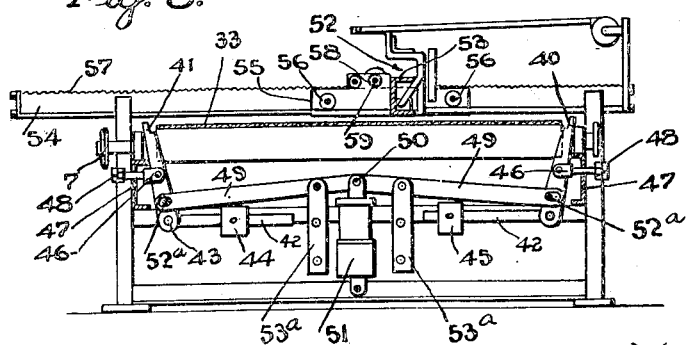

Feb. 6, 1934.  W. OWEN  1,946,356

GLASS CUTTING APPARATUS

Filed April 7, 1933  9 Sheets-Sheet 4

INVENTOR
WILLIAM OWEN.
BY Bradley & Bee
ATTORNEYS

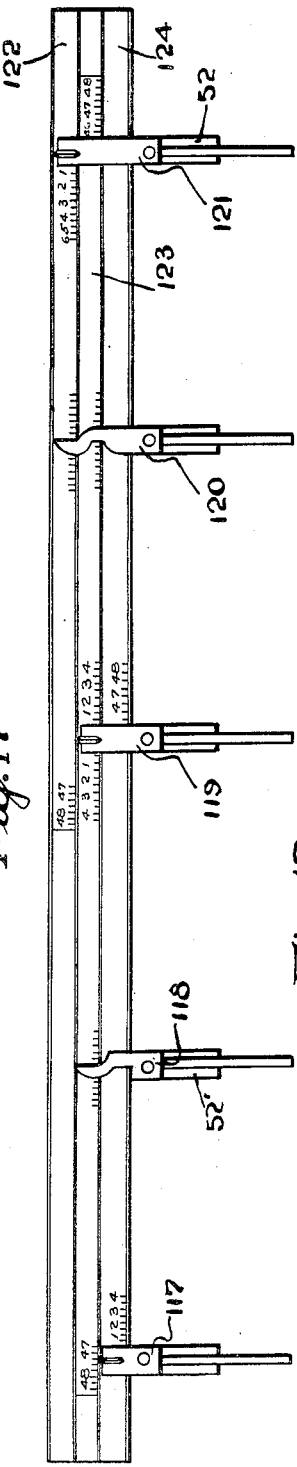
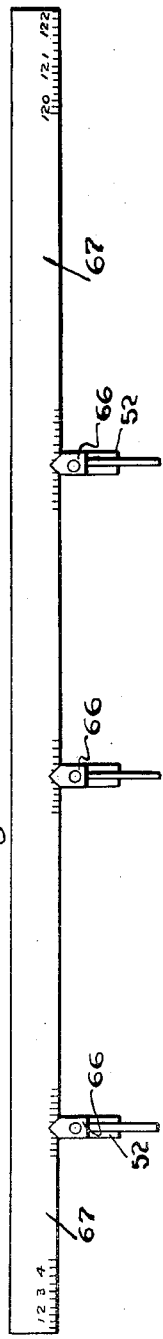
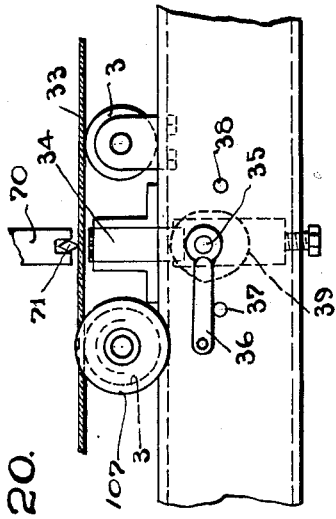
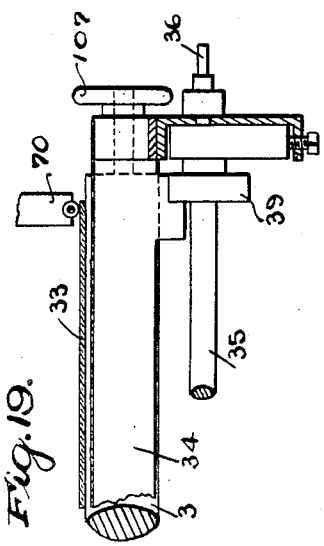

Feb. 6, 1934. W. OWEN 1,946,356
GLASS CUTTING APPARATUS
Filed April 7, 1933 9 Sheets-Sheet 6
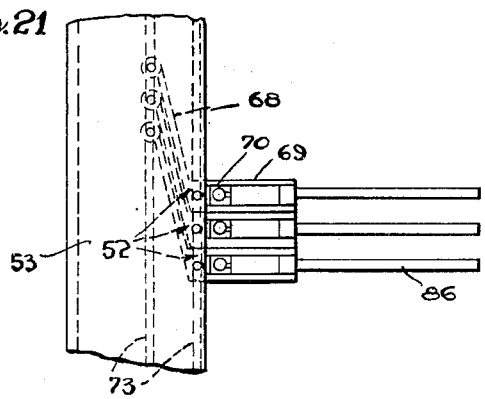
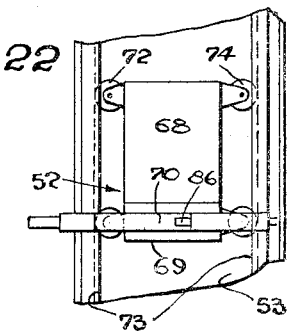
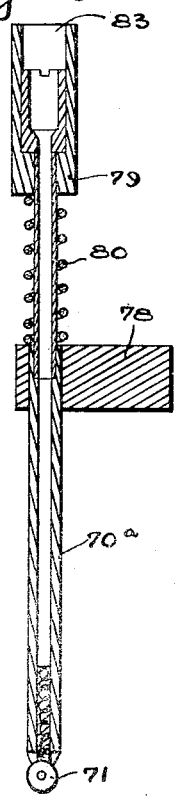
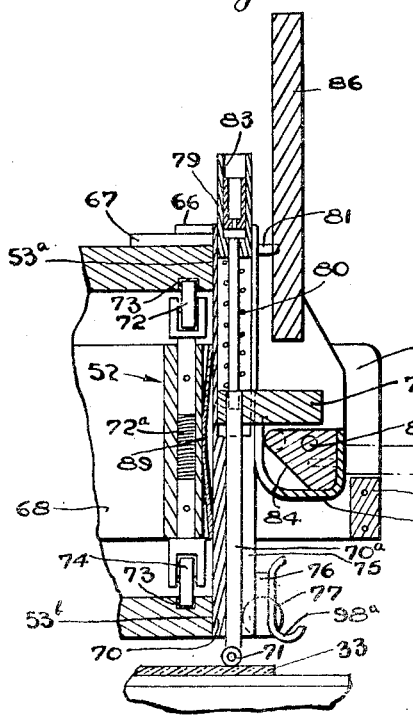
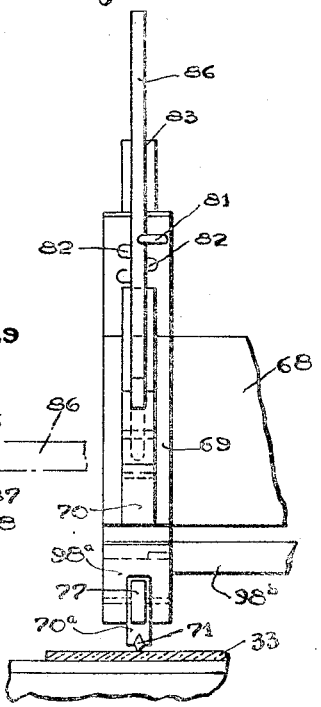
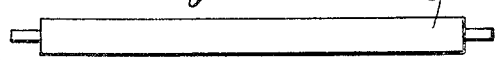
INVENTOR
WILLIAM OWEN
BY
ATTORNEYS Feb. 6, 1934.   W. OWEN   1,946,356
GLASS CUTTING APPARATUS
Filed April 7, 1933   9 Sheets-Sheet 7
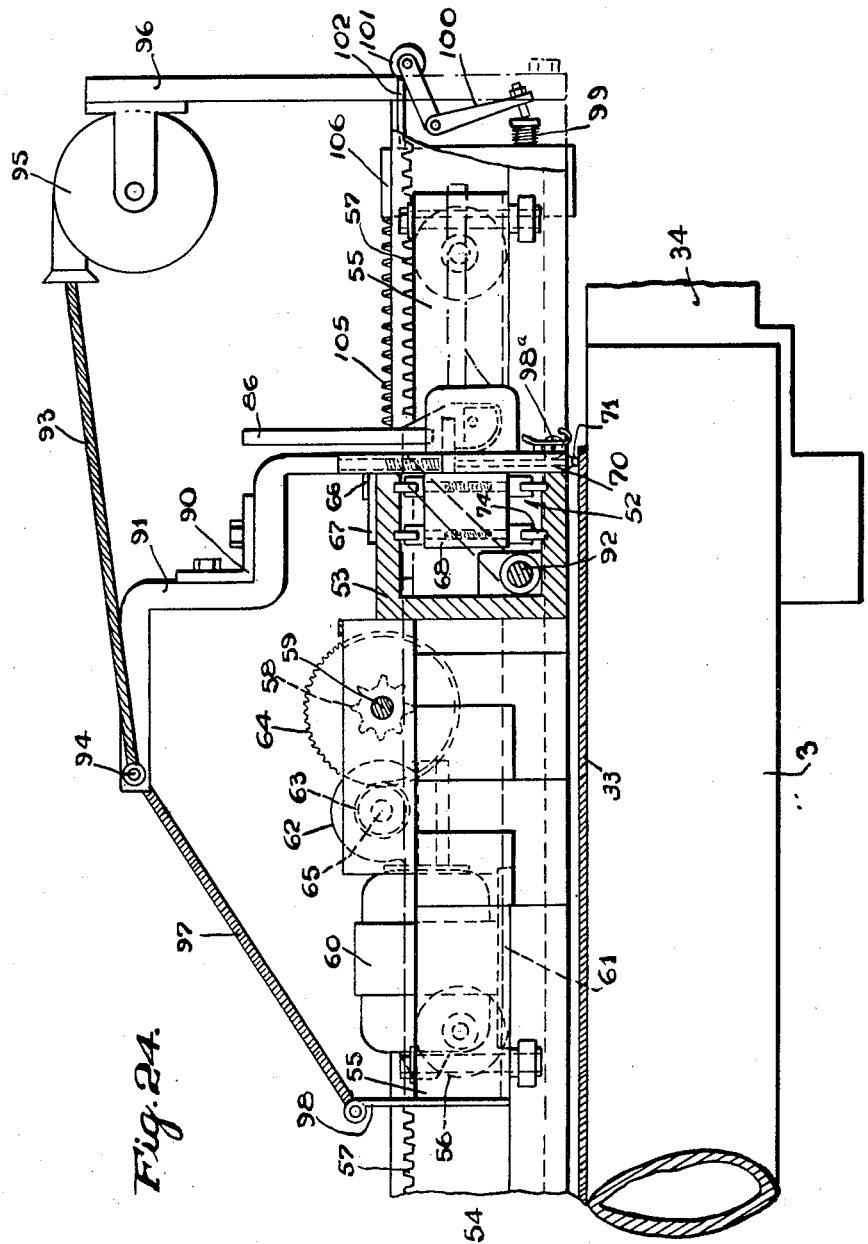
INVENTOR
WILLIAM OWEN.
BY
ATTORNEYS

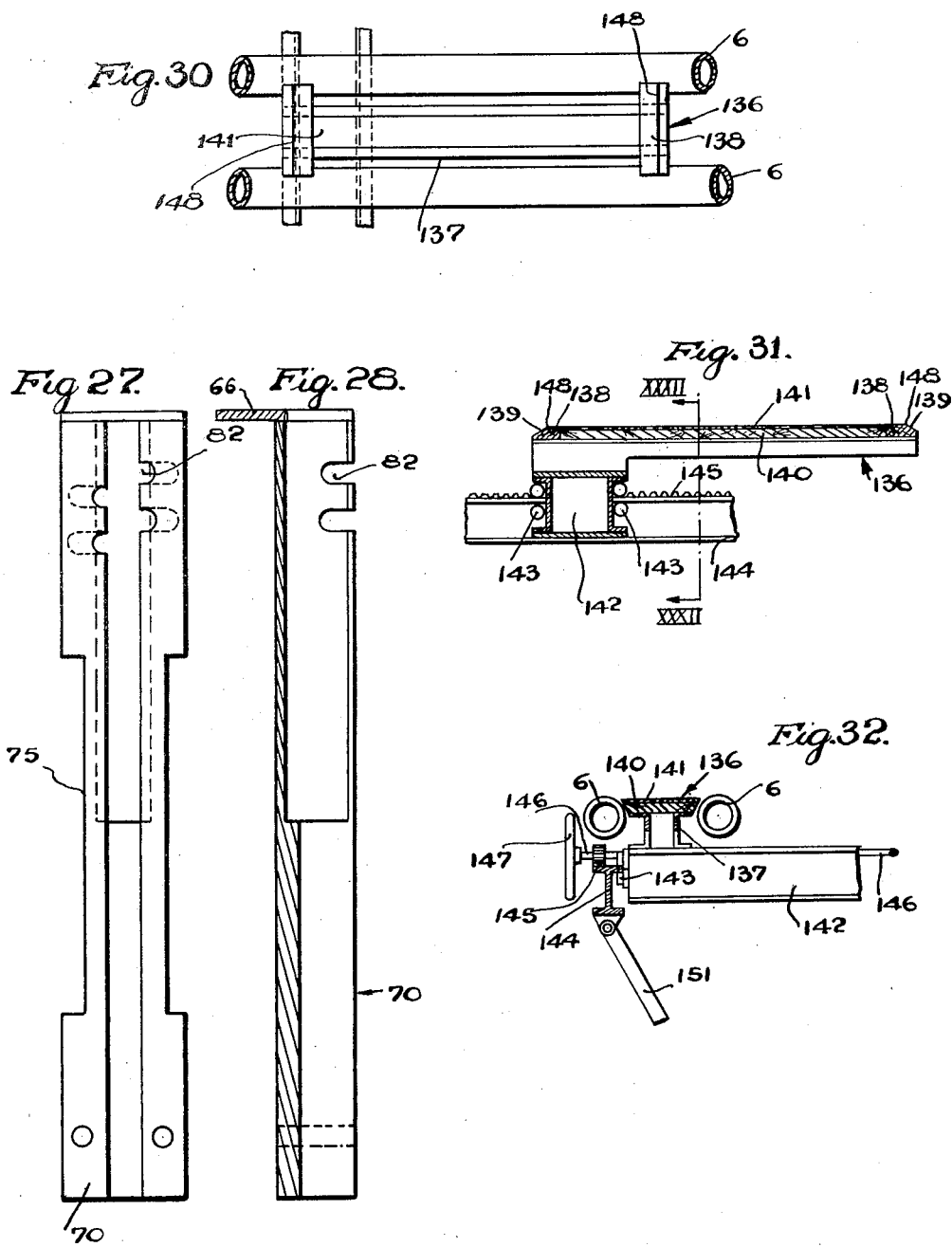

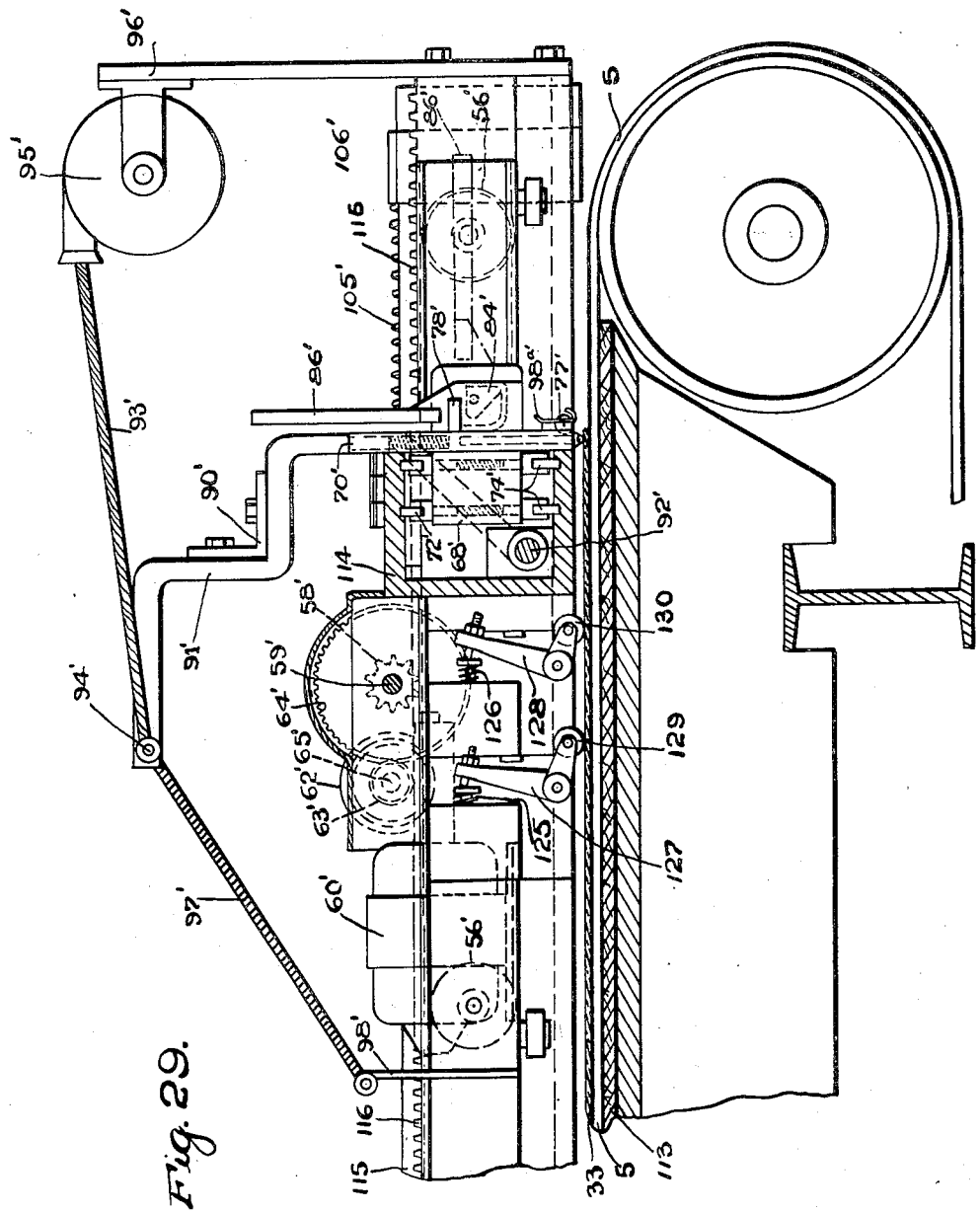

Patented Feb. 6, 1934

1,946,356

UNITED STATES PATENT OFFICE 1,946,356

GLASS CUTTING APPARATUS

William Owen, Pittsburgh, Pa., assignor to Pittsburgh Plate Glass Company, a corporation of Pennsylvania Application April 7, 1933. Serial No. 664,926

16 Claims. (Cl. 49—48)

Figure 6:
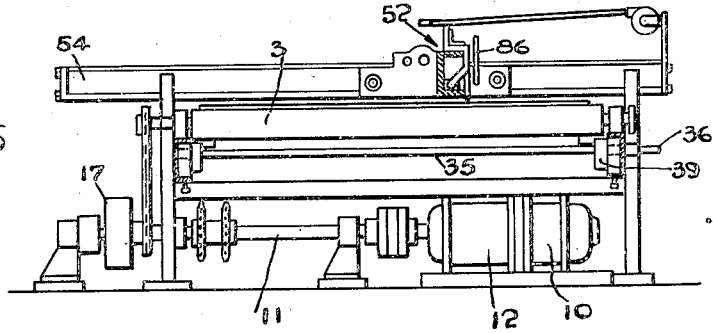
Figure 7:
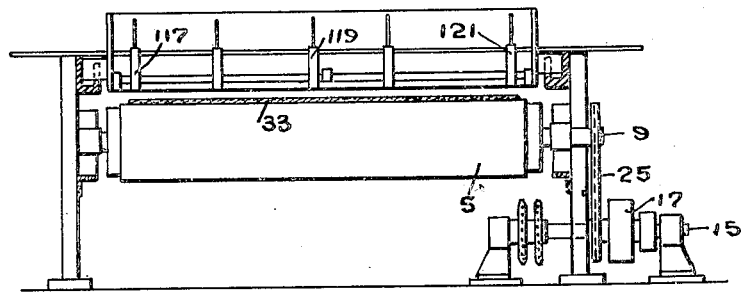
Figure 8:
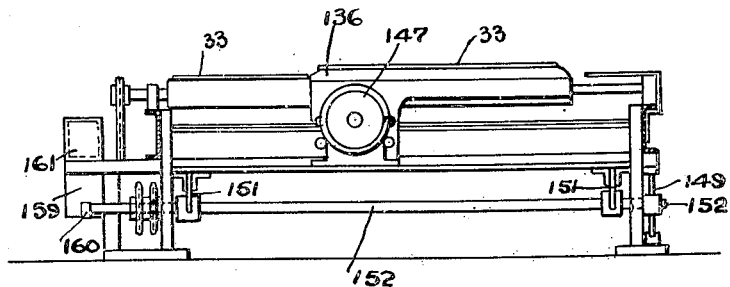
Figure 15:
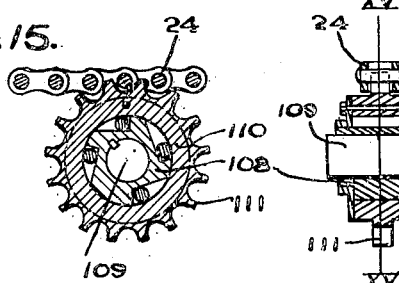
Figure 16:
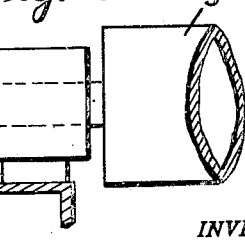

The invention relates to an apparatus for cutting glass plates or sheets into sections in a straight-away operation, on a roller runway, particularly plate glass which has been ground and polished and marked for cutting, but is not limited to use in that connection. The primary objects of the invention are the provision of an improved construction, (1) which will cut the glass in both directions to as close dimension as is done in any other cutting operation; (2) which permits the glass to be cracked off in both directions; (3) which provides for the separation of the cut sheets when the cuts are made to facilitate handling and prevent breakage incident to the rubbing of the cut edges upon each other; and (4) in which the entire operation can be conducted with a fraction only of the labor heretofore required, thus reducing the number of operators and the labor cost to a minimum. One embodiment of the invention is illustrated in the accompanying drawings, wherein:

Figs. 1 and 1a together constitute a plan view of the assembled apparatus. Figs. 2 and 2a comprise a side elevation of the apparatus. Figs. 3 to 8 are vertical sections on the lines III—III to VIII—VIII of Figs. 1 and 1a. Figs. 9 to 15 are diagrammatic views showing one of the glass sheets in the various stages of handling and cutting, such diagrammatic views being placed in each case opposite the portion of the runway of Figs. 1 and 1a at which the sheet is in the condition illustrated. Figs. 15 and 16 are detail views of the pin clutch construction used at the ends of the rollers of two of the runway sections, Fig. 15 being a section on the line XV—XV of Fig. 16, and Fig. 16 being a side elevation partly in section. Figs. 17 and 18 are enlarged detail views showing the strip and cross cutting rules respectively. Figs. 19 and 20 are detail views showing the construction at the ends of the rolls of the cross cutting section of the runway. Figs. 21, 22, 23, 23a, and 24 are enlarged detail views showing parts of the cutter heads and cooperating parts, Fig. 21 being a plan view, Fig. 22 a front elevation, Fig. 23 a vertical section, Figs. 23a and 24 a partial section and partial side elevation. Fig. 25 is a vertical section through one of the cutters. Fig. 26 is a detail view of one of the spacing sticks used in connection with the cutters. Figs. 27 and 28 are detail views of one of the cutter spindle guides, Fig. 27 being a front view and Fig. 28 being a vertical section. Fig. 29 is a partial section and partial side elevation view of the cutting device used on the strip cutting section of the runway. And Figs. 30, 31, and 32 are enlarged detail views showing the cracking off device of section E of the runway, Fig. 30 being a plan view, Fig. 31 a vertical section, and Fig. 32 another vertical section on the line XXXII—XXXII of Fig. 31.

Referring first to the general arrangement as shown in Figs. 1 and 1a, and 2 and 2a, this shows a runway made up of rollers, whose left hand end is preferably in alignment with a roller runway leading from continuous grinding and polishing apparatus. A is the receiving section to which the glass sheets to be cut are supplied either by the roller runway (to the left) or by a tilting frame arranged alongside such section. B is a storage section to which the sheets are supplied from section A and on which they rest while awaiting transfer to the first cutting section. The sheets have prior to this time been inspected and marked for cutting, a typical marking being shown in Fig. 9, in which $a$ is the line of the cross cut, and $bb$ are the lines of the longitudinal or "stripping" cuts. C is the cross cutting section. It is on this section that the cross cut $a$, shown in Fig. 10, is made and the two sheet sections $cc$ are separated, as indicated in Fig. 11. D is the stripping section on which the portion of the sheet which is to be cut longitudinally is scored along the lines $dddd$, as shown in Fig. 13. And E is the strip snapping and separating section on which the glass is first cracked along the lines $dddd$ (Fig. 13), the edges which are snapped off are removed, and the three strips $eee$ are separated, as indicated in Fig. 14.

The glass sheets are carried along the runway by means of the rolls 1, 2, 3, 4, the belt 5, and the rolls 6 by means of sprocket chains passing around sprockets 7 on the end of the roll shafts and around sprockets on the ends of the shafts 8 and 9, which carry the belt 5. The motive power for the drive is supplied by the motor 10 (Fig. 6) which is located midway of the runway and drives the shaft 11 through the intermediary of the reducer 12. The drive is so arranged that rollers of each section A, B, C, D and E of the runway may be connected and disconnected at will, so that the movement of the glass along the runway may be interrupted to permit of the cutting of the glass and its handling as later described. To this end each of the runway sections is driven from the main drive by an independent countershaft provided with a magnetic clutch, which latter is controlled by switches, thus permitting the operator to stop the movement of the rolls of a section whenever this becomes necessary. The countershafts for the sections A, B, C, and E respectively bear the reference numerals 13 to 16, which shafts and the shaft 11 carry at their ends the magnetic clutches 17. The drive for the various countershafts from the drive shaft 11 is accomplished by the chains 18, 19, 20 and 21, which pass around suitable sprockets on the various shafts, as will be apparent from inspection of the drawings without a detailed description. The drive of the rolls of each section and of the belt 5 from the shafts 11, and 13 to 16 is accomplished by the sprocket chains 22, 23, 24, 25, and 26, passing around suitable sprockets. The construction and operation of various sections of the runway beginning with the receiving section A at the left hand end of the system follows:

*Receiving section A.*—The glass sheets to be cut are either supplied to section A from the roller runway to the left of section A (the last roller 27 of which is shown) or by the tilting frame 28 provided with rollers 29 and pivoted at 30 (Figs. 1 and 3). This frame is counterweighted and provided with latches 31 and 32 for holding it either in the upright position shown in full lines or the horizontal position shown in dotted lines, the rollers 29 lying below the rollers 1 of the table when the frame is in the latter position. This frame is utilized when the glass has been stored in racks and is brought to the frame on a vacuum frame or carrier. The glass sheet 33 is placed on the tilting frame, as indicated in Fig. 3, after which the vacuum cups are released and the frame tilted to horizontal position, the sheet pushed over and the frame lowered, thus transferring the sheet to the rolls 1 of the runway. After the sheet is placed on the rolls 1, it is carried by such rolls and the rolls 2 onto the storage section B of the runway which requires no further description. The sheet may be allowed to stop on section B or may be carried along such section without a stop depending on requirements, the operation of the rolls 2 being started and stopped on either or both sections by the manipulation of the magnetic clutches 17 heretofore referred to.

*Cross cutting section C.*—The glass sheet marked for cutting, as indicated on Fig. 9, is now carried onto the section C, where it is stopped with the line *a* (Fig. 10) over one of the bars 34, which are interspersed between the rolls 3. The section C could be operated with a single bar 34, but the use of a number, as shown, makes the operation more convenient, since less shifting of the sheets is required in order to bring the line *a* over one of the bars. The bars, whose upper surfaces carry a cushion of felt, are each mounted for vertical movement and have three positions of vertical adjustment. In its lower position, the bar clears the glass; in its intermediate position, it engages the glass and supports it along the line of cut when the glass is being scored; and in its upper position, its top lies above the peripheries of the rolls 3 so that pressure is applied to the glass causing it to crack. The means for adjusting the bars vertically is shown in Figs. 19 and 20. Extending longitudinally beneath each bar is a shaft 35 provided with a shifting handle 36, by means of which the shaft may be rotated through an angle of 180 degrees, the handle in its two extreme positions taking against the stop pins 37 and 38. The shaft is provided near its ends with the cams 39 for engaging the bar. When the cams are in the position shown, the bar 34 is in its lower position out of contact with the glass sheet. When the shaft is rotated clockwise 90 degrees, the bar is raised so that it engages the lower face of the glass sheet to support it during scoring. And when the shaft is rotated 90 degrees further in a clockwise direction so that its handle 36 engages the stop pin 38, the bar is raised so as to crack off along the line of scoring.

Before the cutting operation over one of the bars 34, as above described, the glass sheet must be squared up so that its center line is parallel to the center line of the table, and preferably so that the center line of the sheet is approximately coincident with the center line of the table. This is accomplished by the arms or fingers 40 and 41 (Figs. 1 and 5), keyed to the shafts 43 journaled in suitable bearings carried by the framework of the runway. The fingers are pressed yieldingly toward each other by the counterweights 44 and 45 carried by the horizontal arms 42 keyed to the shafts 43. In order to limit the inward movement of the fingers, they are provided with the pivoted arms 46, 46 extending slidably through the channels 47, 47 and provided with stop nuts 48, 48. The counterweight 45 is larger than the counterweight 44 and adjusted farther along the lever arms, so that the fingers 41 govern the position of the center line of the glass sheet on the runway and the stop nuts 48 are so adjusted that when the fingers 40 are moved to their innermost position by the counterweight 45, the center line of the sheet will practically coincide with the center line of the runway. Normally the fingers are held in their outer positions as shown in Fig. 5 by a pair of toggle links 49, 49 pivoted at their inner ends to a pin 50 carried by the upper end of the plunger of the hydraulic cylinder 51, the outer ends of these links being slotted and engaging pins 52a carried by the arms or fingers. The weights 53a hold the links and levers in the position shown until hydraulic pressure is supplied to the lower end of the cylinder 51 which lifts the weights and pulls the outer ends of the links inward, thus releasing the pins 52a carried by the fingers 40 and 41 and permitting the counterweights 44 and 45 to move the fingers toward each other, thus squaring up the glass sheet and centering it. The cylinder 51 is under the control of the operator who admits fluid thereto after the glass sheet has been run onto the section C of the runway, or may be operated by the incoming glass engaging a suitable limit switch.

The glass sheet is now on the table squared and centered, and with the line of cut *a* over one of the bars 34. The cross cut is made by means of a cutter carried on heads 52, 52, 52 mounted on a bridge beam 53 for movement longitudinally thereof. The bridge itself extends the length of section C, and is provided with rollers engaging beams 54, 54 which act as a track upon which the bridge rides in making the cross cut. The bridge beam 53 is U-shape in cross section (Figs. 5 and 24), and carries at its end a pair of castings 55, 55 provided with rollers 56, which ride on the flanges of the beams 54, 54, which act as the track for the bridge. The upper edges of the beams 54, 54 are provided with racks 57, 57 engaged by pinions 58, 58 on the end of a shaft 59 extending longitudinally of the bridge. The shaft 59 is driven (to move the bridge) from the motor 60 (Figs. 1a and 24) supported on a platform 61 (secured to the bridge beam) through the intermediary of worm gearing in the casing 62 (Fig. 24) and the spur gears 63 and 64 carried respectively by the shaft 65 of the worm wheel and the shaft 59.

The cutter heads 52 are preferably three in number and are mounted for adjustment longitudinally of the bridge beam 53 so that when desired, three cross cuts $a$ may be made across the sheet instead of only a single cut $a$ (Fig. 10). Each cutter head carries a pointer or indicator 66 which moves over the graduated rule 67 (Figs. 1 and 18) so that each head and the cutter carried thereby may be set with exactness with respect to the left hand end of the rule at which the graduations start. Each cutter head or carriage comprises an upright plate 68 carrying at one end a fork 69 (Fig. 21) in which is mounted the guide 70 which carries the cutter spindle 70$a$ provided at its lower end with a cutting or scoring wheel 71. The plate 68, which forms the body of the carriage or head is provided at its upper edge with a pair of rollers 72 (Figs. 23 and 24) engaging the parallel grooves 73 (Fig. 22) in the upper flange of the beam 53 (Fig. 21), while at its lower edge such plate is provided with another pair of rollers 74 engaging similar parallel grooves in the bottom flange of the beam. Springs 72$a$ interposed between the spindles of the rollers permit their retraction to free the rollers from their grooves. The angular arrangement of the plates 68 permits the headers 52 to be gotten close together, as indicated in Fig. 21, so that it becomes possible to make cross cuts in the glass sheet which is relatively close together, thus reducing the loss in cutting out strips carrying defects.

The guide 70 is of rectangular cross section (Figs. 27 and 28) and has its sides slotted at 75 so that it can be slid into the fork 69 and held against vertical movement therein. It receives the cutter spindle 70$a$, and is provided at its lower end with a block 76 (Fig. 23) carrying a roller 77 which engages the lower end of such spindle and guides it in its up and down movement. The spindle 70$a$ has rigidly secured to it intermediate its ends the arm 78. Slidably mounted on the spindle above the arm is a collar 79 with a spring 80 interposed between the arm and collar. The collar is provided with a latch pin 81 adapted to engage one of the notches 82 in the guide 70 (Figs. 23$a$ and 27). When the collar is moved downward on the spindle and its latch pin engaged with one of the notches 82, the spring is placed under compression, thus applying yielding pressure to the arm 78 to force the cutter carried by the spindle into engagement with the glass sheet. When the latch pin is removed from the notch, the spindle can be removed from its guide 70. The cutter spindle is made hollow to provide for the passage of a cutting lubricant which is supplied to the cup 83.

The arm 78 and the cutting spindle carried thereby are controlled in their up and down movements by a cam 84, pivoted at 85 in the fork 69 (Fig. 23) and secured to an operating lever 86, such lever being shown in the position occupied when the cutter is down on the glass. When the lever is swung to the right (Fig. 23) through an angle of 90 degrees, at which time its movement is arrested by the stop 87, the nose of the cam pushes the arm upward against the tension of the spring 80, thus raising the spindle to non-cutting position. The cam also performs the function of clamping the cutter head in any desired position of adjustment along the length of the bridge beam 53. This clamping action is accomplished by the use of the spring 88, whose curved end bears against the side of the guide 70, so that when the parts are in the position shown in Fig. 23, the guide is pressed yieldingly to the left by the spring into engagement with the flanges 53$a$ and 53$b$ (Fig. 23) of the bridge beam. When the lever 86 is swung to the right, the spring 88 is moved away from the guide so that it no longer presses against the beam flanges, and the head with its cutter is adjustable freely along the length of the beam. At this time a leaf spring 89 secured to the cutter head 52 presses the guide 70 to the right in the fork 69 so that it no longer contacts with the flanges 53$a$ and 53$b$.

The spindles 70$a$ are shown as provided with cutters in the form of the wheels 71, but diamond cutters may be used, if desired. The wheels are carried by spring clip members which are pushed into the end of the spindle and held frictionally so as to be readily removable and replaceable, this being a detail of construction well known in the art.

After a cut has been made, it is necessary, as heretofore explained, to move the cutter spindle or spindles to non-cutting or inoperative position by swinging the lever to the right to move the nose of the cam 84 upward and provision is made for doing this conveniently from one side of the runway. The device for doing this comprises a bar 90 (Fig. 24) extending the length of the runway and carried at its ends on a pair of arms 91, 91 pivoted at 92. When the bar is swung to the right, it engages all of the levers 86 which are in upright position and swings them to horizontal position. The swinging of the arms is accomplished by a rope 93 which is attached to a bolt 94 and has its right hand end secured to a spring reel 95 carried by a bracket 96, the reel serving to take up the slack in the rope at all times. A spring 97 attached at one end to the bolt 94 and at the other to a bracket 98 on the cutter carriage brings the arms 91 back to upright position when the rope is released, so that the levers 86 may be reset by the operator preliminary to the next cut.

The blocks 76 are provided with lips 98$a$ (Fig. 23) to receive the ends of the cutting sticks 98$b$ (Fig. 26), and thus space the cutters apart definite distances, so that a strip of any desired exact width may be cut from the glass sheet without using the rule 67 (Fig. 18) as a means for spacing the cutters apart the desired distance. This stick may be used to advantage in cutting windshields, in which the dimensions may be read in thirty-seconds or sixty-fourths of an inch. The rule 67 is not graduated this finely, and the operator would have great difficulty in getting the exact dimension without the use of the sticks, which are of the exact dimension required in order to space the cutters.

In order to prevent an over travel of the bridge after the cutters have reached the edge of the sheet automatic cut off means are provided which are operated by the bridge. Such means include a limit switch 99 at each side of the runway, bell crank levers 100, whose lower ends engage the limit switches and whose upper ends are provided with rollers 101, and a sliding rod 102 at the end of section C. The bridge beam is provided with a collar 103 (Fig. 1) slidable on the rod 102 and adapted to engage collars 104, 104 secured to the rod. Springs 105 are mounted on the rod between the collars 104 and the bearing 106 in which the rod slides, the purpose of the springs being merely to slow the bridge up and return the rod to starting position after the actuation of the switch. When the bridge reaches the limit of its travel, the rod engages the roller 101 on the switch lever 100 and causes it to actuate the limit switch, thus cutting off the supply of the current to the motor 60 which moves the bridge. The movement of the bridge in both directions is controlled in this manner.

As heretofore described, the glass sheet is supported during the cutting operation by one of the bars 34, which is raised by the cams 39 (Fig. 20) so that its upper side engages the lower surface of the glass. After the glass has been scored, the cam is rotated still further so that the bar is raised, putting pressure on the glass beneath the line of scoring and causing it to crack off along the line $a$. It is now desirable to separate the glass sections $cc$ (Fig. 11), and this is accomplished by the provision of means whereby the rolls 3 supporting the forward section may be rotated independently of the other rolls 3 in order to carry such section a few inches ahead of the other section. This is accomplished by providing each roll 3 with a one-way pin clutch at the driven end, as shown in Figs. 15 and 16, and by providing the other ends of the rolls with the hand wheels 107 shown in Figs. 19 and 20. Any type of one-way clutch may be employed. The one shown in Figs. 15 and 16 comprises the inner collar 108 having pin recesses keyed to the shaft 109 of the roll 3, and the outer collar 110 which is provided with the sprocket 111 engaged by the drive chains 24 of section C. Since the magnetic clutch 17 (Fig. 1) is not in driving engagement at this time, the collar 110 is held against movement by the drive chain, but the inner collar 108 and the roll can be rotated forwardly by means of the hand wheels 107 to carry the forward section of the glass sheet ahead as far as desired. After the glass sections have been separated, the magnetic clutch 17 is energized so that the chain 24 is driven and all of the rolls 3 are rotated, thus carrying the glass sections along the runway onto section D where the rear section is to be cut longitudinally into strips $ccc$ (Fig. 12) and the edges trimmed off. This section D of the runway will now be described. The section of the sheet which requires no further cutting is carried along over sections D and E.

*Longitudinal cutting section D.*—This section, which is generally referred to as the stripping section, is provided at its left hand end with rollers 4 (Fig. 1a) which carry the glass sheet onto the belt 5. Beneath the top flight of the belt is a fixed floor or deck 113 (Fig. 2a) of wood for holding such flight flat and level during the scoring operation. The scoring apparatus and method of operation are substantially the same as described in connection with the cross cutting apparatus of section C except that the bridge beam 114 extends transversely of the runway instead of longitudinally thereof, and the channel beams 115 which constitute the track on which the bridge moves extend longitudinally of the runway. The beams 115 are provided with racks 116 corresponding in function to the racks 57 of section C and the motor and driving connections are the same throughout as described in connection with section C. These parts, therefore, require no further description and are given the same reference numerals except that a prime is applied thereto, as will be seen by reference to Fig. 29.

The only differences in the construction of the longitudinal cutting arrangement of Fig. 29, as compared with that of the cross cutting arrangement of Fig. 24, lies in the rule construction (Fig. 17) and in the automatic stop switches.

As shown, the bridge as equipped with five heads each provided with a cutter corresponding to the indicators 117 to 121. The indicators, which are attached to the cutter head, work over the three sliding rules 122, 123 and 124. The rule 123 reads both ways from its center, and is attached to the center indicators 119 so as to move therewith. The rule 122 reads from its right hand end, and is attached to the indicator 121 so as to move therewith, while the rule 124 reads from its left hand end, and is attached to the indicator 117 so as to move therewith. The indicators 118 and 120 are movable independently of any of the rules. By the use of this arrangement the operator can set either center indicator 119 and measure his distances for the other indicators from such point as a base, or he can set the end indicators 117 and 121 so as to trim off the edges of the sheet and then measure from such indicators as a base in setting the other three indicators (or two indicators as the case may be). In either case, the scales give a direct reading of the distances from the base points so that the operator has no additions or subtraction to make, and does not have to use a separate measuring stick or rule in setting the indicators. In setting the rules to cut the sheet as shown in Fig. 12, the indicators 117 and 121 can first be positioned to trim the edge off the sheet, after which, the indicators 118 and 120 can be set to divide up the distance between the edge cuts in any way desired. The distance of the indicator 118 from the indicator 117 may be read on the rule 124, and the distance of the indicator 120 from the indicator 121 may be read on rule 122. In case the two middle lines of cut on the sheet of Fig. 12 are established by defects on such lines through which the cutters must pass, the indicators 118 and 120 are placed over these lines, and the cutter heads carrying the indicators 117 and 121 set to cut strips of the desired width. In such case, rule 124 is used to set the indicator 117 and thus give a strip of the desired width between the indicators 117 and 118, while the rule 122 is used to set the indicator 121 and give a strip of the desired width between indicators 120 and 121.

The movement of the bridge longitudinally of the runway may be controlled by limit switches arranged like the limit switches 99 of the cross cutting bridge and such equipment is shown in Fig. 1a, but in addition another arrangement of limit switches may be used, as shown in Fig. 29. In this construction, the limit switches are controlled by the glass sheet itself. In accomplishing this result, two limit switches 125 and 126 are employed operated by the bell crank levers 127 and 128 provided with rollers 129 and 130 adapted to ride on the glass sheet. When the bridge moves to the left in making the cut, the roller 129 moves down as it passes off of the sheet, thus actuating the switch 125 which throws a resistance into the motor windings which acts as a brake on its operation and on the movement of the bridge. When the roller 130 passes off of the sheet, the limit switch 126 is operated, cutting off the current to the motor. By this means the bridge is stopped automatically just as the cutters reach the edge of the glass sheet so that the cutters are prevented from dropping onto the belt which supports the glass, and avoiding injury to the cutters, the belt, and the next piece of glass.

The space between sections D and E of the runway is bridged by a drop gate or apron comprising the arms 131 (Figs. 1a and 2a), carrying at their ends the rollers 132. This bridge can be swung from the horizontal full-line position shown in Fig. 2a to the vertical dotted line position shown in such figure, permitting the operator to stand between sections D and E while setting the cutter heads on the bridge 114. The arms 131 carry a beam 133 which lies below the roller 132 when the arms are in horizontal position, but which projects above the level of the roller when the arms are in vertical position (Fig. 2a), so that such beam acts as a stop to prevent the glass from accidentally being fed into the space between the sections D and E, while such space is occupied by the operator. The apron is held in horizontal position by means of a handle 134 which is engaged by a latch 135 of suitable construction carried by the framework of the runway. The glass having been scored longitudinally on the section D, as indicated in Fig. 12, is ready for cracking along the lines of scoring dddd, and for this purpose is moved onto the runway section E, this being accomplished by energizing the magnetic clutch 17, so that the belt 5 is operated, thus moving the glass sheet over the apron and onto section E.

*Strip snapping section E.*—Two operations are performed on this section. The scored glass is first cracked off along the lines of scoring (Fig. 13), and the strips, as thus formed, are then separated, as indicated in Fig. 14, preliminary to feeding the sheets forwardly off of section E, thus completing the operation. The support for the glass sheet on section E comprises a series of bars 136, 136, etc. interspersed by the rolls 6, 6, 6, etc. The rolls are always maintained at the elevation shown in the drawings, but the bars are mounted for vertical movement, and may lie either at the position shown in Fig. 32, with their upper faces just below the level of the tops of the rolls, or they may lie with their upper faces above the level of the tops of the rolls. They are moved to the latter position to secure the cracking off action, and when in such position, may be moved endwise, in order to secure the separation of the glass strip lying on the bars from the adjacent strip lying on the rolls at the ends of the bars.

The bars 136 are in length slightly greater than one-half the width of the runway (Figs. 1a and 8), and each comprises a pair of channels 137 carrying at the ends the transverse wood blocks 138 beveled as indicated at 139 with a wood strip 140 between the blocks carrying a felt strip 141. The channels 137 are rigidly connected at their ends to a beam 142 built up of channels and extending the length of the runway section E (Fig. 2a). This beam constitutes a carriage, being provided at each end with four rollers 143 (Figs. 8 and 31) which engage the upper flanges of a pair of I beams 144 extending transversely of section E at each end thereof, and constitute a track for the carriage. A rack bar 145 is also provided along the upper edge of each of the beams 144 engaged by a pair of pinions carried on a shaft 146 extending longitudinally of the carriage and provided with a hand wheel 147 at each end (Figs. 1a and 2a). By rotating one of the hand wheels, the carriage may be moved back and forth along the track beams 144, so that the position of the bars 136 may be shifted, as desired, in order to bring the edges 148 (Fig. 31) of the blocks 138 beneath the line of scoring on the glass sheet to cause cracking along such line when the bars are raised above the level of the tops of the rolls 6, as later described.

Provision is made for lifting the carriage beam 142 in order to raise the bars 136, and thus cause the sheet to crack along the line of scoring. This is accomplished by the bell crank levers 149, 149 and 150, 150, each of which has one arm connected to the beam 144 by means of a link 151, such levers being mounted on transverse shafts 152 and 153 journaled in the framework of the runway. Counterweights 154 and 155 carried on arms 156 and 157 keyed to the shafts 152 and 153 serve to counterbalance the weight of the beam 142 and the parts carried thereby. The other arms of the bell crank levers 149 and 150 are connected by a rod 158, so that such levers operate in unison. Power means are provided for rocking the shaft 152 in the form of a hydraulic cylinder 159, whose lower end is pivoted to a lever arm 160 keyed to the shaft 152. The plunger 161 which works in the cylinder has its upper end pivoted to the framework of the runway. By this means the beam and the bars 137 carried thereby can be moved up and down to lift the glass sheet in order to cause it to crack off the glass sheet into sections.

When the glass sheet is run onto section E, the bars are in lowered position. After the sheet is in position on the rollers 6, the beam 142 is shifted laterally until one set of the block corners 148 lie in alignment with one of the lines d on which the glass is scored longitudinally. The cylinder 159 is then operated to lift the track beams 144 and the carriage beam 142 with the bars 136 thereon, thus lifting the glass sheet from the rolls, so that the portion of the sheet lying to one side of the blocks is unsupported. The weight of such portion, aided if necessary by pressure applied by the hand of the operator causes the sheet to crack along the line of scoring lying above the corners 148. Such pressure will be necessary in order to trim off the edges of the sheet which are not of sufficient weight to crack off by gravity. As the edge strips are cracked off, they are removed from the runway and thrown into a cullet receptacle. When two sheet sections have been cracked apart, it is desirable to separate them laterally, as indicated in Fig. 14, and this is accomplished by moving the bars 136 which carry one of the glass sections endwise the desired distance before lowering the bars to rest on the rolls 6. After one cracking and separating operation has occurred, the operation is repeated until all the sections are cracked off and separated, bringing the glass to the condition shown in Fig. 14. The making of the bars 136 of a length only slightly greater than half the width of the runway with the provision of the two sets of cracking off corners 148, 148, gives the apparatus the flexibility necessary in order to handle the cracking off operations easily and conveniently regardless of the manner in which the sheet is subdivided longitudinally.

After the sheet has been cracked and separated, as above described, the bars 36 are lowered and the magnetic clutch 17 is energized to operate the rolls 6, the sheet sections thus being run off of section E onto a roller receiving section, whose end 162 is in alignment with the right end of section E. A drop apron is provided at the right hand end of section E similar to the one between sections C and E, the purpose being as before to permit the operator to stand in the space between the sections, as occasion demands, when the rollers 6 are not being driven. This apron at the right of section E is substantially the same in the matter of detail as the apron at the left of such section and bears the same reference numerals.

The operation briefly stated is as follows: The glass sheets to be cut into sections are supplied to section A of the runway from racks by the tilting transfer frame 28 or by feeding them onto this section from the roller runway at the left of section A. When the sheets are supplied by means of the frame 28, the magnetic clutch 17 is disconnected so that the rollers 1 are non-rotating. After the glass sheet has been applied to the rollers 1, the magnetic clutch 17 is energized so that the glass sheet is fed onto the storage section B of the runway. Through the control by the magnetic clutch 17 at the forward end of this section, the sheet may be either carried along continuously over the section or allowed to rest upon the section, depending upon whether or not the next section C is ready to receive the sheets from the storage section. The next step is squaring up the sheet and centering it on the runway, this being accomplished by the fingers 40 and 41, shown in Fig. 5, which are operated from the cylinder 51 so as to press against the opposite sides of the sheet and bring it to central position, as heretofore described. The sheet is now ready for cross cutting and is moved along the runway until the transverse line of cut which has been marked with chalk lies above one of the beams 34. The beams 34 are normally below the level of the rolls 3, but when the cut is made, the beam is raised by means of the cams 39 (Figs. 19 and 20) so that the beam presses against the lower face of the glass and supports it. The glass is scored, as heretofore described, by means of one of the cutters carried by the bridge 53, such bridge being moved longitudinally of the bars 34 by means of the motor 60 which rotates the shaft 59 carrying pinions which mesh with the racks 57. After the scoring operation is completed, the cutter carried by the bridge is moved to inoperative position and the bridge moved back to starting position. The glass is now cracked along the line of scoring by rotating the cams 39 to elevate the bar 34 and apply pressure to the lower side of the sheet. In order to separate the sheets thus formed, as indicated in Fig. 11, the rolls 3 which carry the forward section are rotated by the hand wheels 107, thus carrying the sheet along a few inches to give the necessary steps. The magnetic clutch 17 of the section C is now operated to carry the glass sheets onto the section D of the runway, this being accomplished by the rolls 3 and 4, and belt 5 through the drive of the magnetic clutches 17 at the forward end of sections C and D. When the sheet has arrived at proper position upon the belt 5, the magnetic clutch is disconnected so that section C stops on the belt preparatory to the making of the longitudinal cuts d. The cutting is accomplished by the bridge 114 carrying the cutters whose positions are shown by the indicators 117 to 121 of Fig. 17. After these indicators have been set, the bridge, actuated from the motor 60', is moved longitudinally of the belt and the glass sheet thereon, scoring the sheet along the lines d. After the cutters have been moved to their inoperative positions, the magnetic clutch 17 is energized so that the scored sheet of glass is carried over the apron and onto section E preparatory to cracking off the sheet along the lines d. At the time the sheet passes onto section E, the carriage 142 carrying the transverse bars 136 is in its lower position so that the upper edges of the beams lie below the tops of the rollers 6. After the sheet arrives on section E, the clutch 17 at the forward end of the section is stopped, so that the glass sheet becomes stationary. The carriage 142 is now adjusted longitudinally of the rolls 6 by means of one of the hand wheels 147 until the corners 148 (Fig. 31) of the bars lie beneath one of the lines of scoring d. The hydraulic cylinder 159 is next operated to lift the carriage 142 and bars 136, so that the portion of the glass sheet resting upon such beams is raised, leaving the portion of the sheet to one side of the corners 147 unsupported, causing the sheet to crack along the scoring lying above the corners 148. One of the hand wheels 147 is now rotated to carry the bars 136 laterally a short distance in order to separate the cut-off portion of the sheet from the balance thereof. This operation is repeated until the sheet has been separated along the lines of scoring, after which the magnetic clutch 17 is energized to carry the glass sheets forwardly off the section E, thus completing the operation.

What I claim is:

1. In combination in glass cutting apparatus, a runway comprising a plurality of sections in alignment, each provided with forwarding means for carrying the glass sheets to be sectioned or cut thereover, means whereby each forwarding means may be operated intermittently independent of the forwarding means of the other sections, a carriage movable transversely over one section provided with means for cross scoring the glass sheet on such section, means on such section for cracking the glass on the line of cross scoring, a carriage movable longitudinally of the section which follows the first section provided with means for longitudinally scoring the glass sheet on such section, and means on the section which follows said last section for cracking the glass sheet on the line of longitudinal scoring.

2. In combination in glass cutting apparatus, a runway comprising a plurality of sections in alignment, each provided with forwarding means for carrying the glass sheets to be sectioned or cut thereover, means whereby each forwarding means may be operated intermittently independent of the forwarding means of the other sections, means on one section for squaring up and centering the glass sheet on such section, a carriage movable transversely over such section provided with means for cross scoring the glass sheet after it is squared and centered, means also located on such section for cracking the glass on the line of transverse scoring, a carriage movable longitudinally of the section which follows the first section provided with means for longitudinally scoring the glass sheet on such section, and means on the section which follows said last section for cracking the glass sheet on the line of longitudinal scoring.

3. In combination in glass cutting apparatus, a runway comprising a plurality of sections in alignment, each provided with forwarding means for carrying the glass sheets to be sectioned or cut thereover, means whereby each forwarding means may be operated intermittently independent of the forwarding means of the other sections, a tilting transfer frame at the side of the first section of the runway pivoted on an axis parallel to the longitudinal center line of the runway and adapted to transfer glass sheets supplied to the frame to said section, a carriage movable transversely of the section which follows the first section provided with means for cross scoring the glass sheet on such section, means on such section for cracking the glass on the line of cross scoring, a carriage movable longitudinally of the section which follows the first section provided with means for longitudinally scoring the glass sheet on such section, and means on the section which follows said last section for cracking the glass sheet on the line of longitudinal scoring.

4. In combination in glass cutting apparatus, a runway comprising a plurality of sections in alignment, each provided with forwarding means for carrying the glass sheets to be sectioned or cut thereover, means whereby each forwarding means may be operated intermittently independent of the forwarding means of the other sections, a tilting transfer frame at the side of the first section of the runway pivoted on an axis parallel to the longitudinal center line of the runway and adapted to transfer glass sheets supplied to the frame to said section, means on the section which follows the first section for squaring up and centering the glass sheet on such section, a carriage movable transversely over such section provided with means for cross scoring the glass sheet after it is squared and centered, means also located on such section for cracking the glass on the line of transverse scoring, a carriage movable longitudinally of the section which follows the first section provided with means for longitudinally scoring the glass sheet on such section, and means on the section which follows said last section for cracking the glass sheet on the line of longitudinal scoring.

5. In combination in glass cutting apparatus, a runway comprising a plurality of sections in alignment, each provided with forwarding means for carrying the glass sheets to be sectioned or cut thereover, means whereby each forwarding means may be operated intermittently independent of the forwarding means of the other section, a carriage movable transversely over one section provided with means for cross scoring the glass sheet on such section, means on such section for cracking the glass on the line of cross scoring, means on such section for separating the sectional sheets formed by cracking the sheet transversely, a carriage movable longitudinally of the section which follows the first section provided with means for longitudinally scoring the glass sheet on such section, and means on the section which follows said last section for cracking the glass sheet on the line of longitudinal scoring.

6. In combination in glass cutting apparatus, a runway comprising a plurality of sections in alignment, each provided with forwarding means for carrying the glass sheets to be sectioned or cut thereover, means whereby each forwarding means may be operated intermittently independent of the forwarding means of the other sections, a carriage movable transversely over one section provided with means for cross scoring the glass sheet on such section, means on such section for cracking the glass on the line of cross scoring, means on such section for separating the sectional sheets formed by cracking the sheet transversely, a carriage movable longitudinally of the section which follows the first section provided with means for longitudinally scoring the glass sheet on such section, and means on the section which follows said last section for cracking the glass sheet on the line of longitudinal scoring and for separating the sectional sheets thus formed.

7. In combination in glass cutting apparatus, a runway comprising spaced rolls, means for driving the rolls to carry a glass sheet thereover, a vertically movable bar between two of the rolls having three positions of adjustment, first, with its upper surface below the tops of the rolls, second, with its upper surface level with the tops of the rolls so as to support the glass sheet during the scoring operation, and third, with its upper surface above the level of the rolls to cause a cracking off of the glass sheet along the line of scoring when the bar is moved to such third position, means for moving the bar vertically, and a carriage movable transversely of the runway and provided with means for scoring the glass sheet.

8. In combination in glass cutting apparatus, a runway comprising spaced rolls, means for driving the rolls to carry a glass sheet thereover, a vertically movable bar between two of the rolls having three positions of adjustment, first, with its upper surface below the tops of the rolls, second, with its upper surface level with the tops of the rolls so as to support the glass sheet during the scoring operation, and third, with its upper surface above the level of the rolls to cause a cracking off of the glass sheet along the line of scoring when the bar is moved to such third position, cam means for moving the bar vertically from the lowest position to its two higher positions of adjustment, and a carriage movable transversely of the runway and provided with means for scoring the glass sheet.

9. In combination in glass cutting apparatus, a runway comprising spaced rolls, means for driving the rolls to carry a glass sheet thereover, a series of vertically movable bars interspersed between the rolls, each having three positions of adjustment, first, with its upper surface below the tops of the rolls, second, with its upper surface level with the tops of the rolls so as to support the glass sheet during the scoring operation, and third, with its upper surface above the tops of the rolls to cause a cracking off of the glass sheet along the line of scoring when the bar is moved to such third position, means whereby each bar may be moved vertically independently of the other bars, and a carriage movable transversely of the runway and provided with means for scoring the glass sheet.

10. In combination in glass cutting apparatus, a runway comprising spaced rolls, means for driving the rolls to carry a glass sheet thereover, comprising a one way clutch at the end of each roll and a common power driving means for such clutches, a throw out means for said last driving means whereby the rotation of the rolls may be interrupted to stop the movement of the glass sheet along the runway, means for scoring the glass sheet transversely of the runway, means for cracking the glass sheet along the line of scoring, and hand operated means for rotating each roll independently of the other rolls to permit a separation of the sections of the glass sheet.

11. In combination in glass cutting apparatus, a pair of runway sections in alignment, each provided with means for forwarding a glass sheet thereover, glass severing means on the section which first receives the sheet, throwout means for the forwarding means of said last section whereby the movement of the glass sheet thereover may be stopped, and a pivoted drop apron between the sections for bridging the space therebetween, said apron having stop means for preventing the forward movement of the glass thereover when the apron is swung down from operative position to provide a space between the sections.

12. In combination in glass cutting apparatus, means for scoring a glass sheet longitudinally, a runway comprising spaced rolls for receiving the scored sheet, means for driving the rolls intermittently, so that the glass sheet may be stopped on the rolls or carried therealong, a series of bars interspersed between the rolls of less length than the rolls having their ends in alignment and together constituting a cracking off table, a common support for the bars movable vertically and laterally, and means for moving such support vertically and laterally.

13. In combination in glass cutting apparatus, means for scoring a glass sheet longitudinally, a runway comprising spaced rolls for receiving the scored sheet, means for driving the rolls intermittently, so that the glass sheet may be stopped on the rolls or carried therealong, a series of bars interspersed between the rolls all of the same length which is less than the length of the rolls and having their ends in alignment and together constituting a cracking off table, a common support for the bars movable vertically and laterally, and means for moving such support vertically and laterally.

14. In combination in glass cutting apparatus, means for scoring a glass sheet longitudinally, a runway comprising spaced rolls for receiving the scored sheet, means for driving the rolls intermittently, so that the glass sheet may be stopped on the rolls or carried therealong, a series of bars interspersed between the rolls of less length than the rolls having their ends in alignment and beveled at such aligned ends, a common support for the bars movable vertically and laterally, and means for moving such support vertically and laterally.

15. In combination in glass cutting apparatus, means for scoring a glass sheet longitudinally, a runway comprising spaced rolls for receiving the scored sheet, means for driving the rolls intermittently, so that the glass sheet may be stopped on the rolls or carried therealong, a series of bars interspersed between the rolls of less length than the rolls having transverse heads at their ends bridging the spaces between the rolls and arranged in alignment, a common support for the bars movable vertically and laterally, and means for moving such support vertically and laterally.

16. In combination in glass cutting apparatus, means for scoring a glass sheet longitudinally, a runway comprising spaced rolls for receiving the scored sheet, means for driving the rolls intermittently, so that the glass sheet may be stopped on the rolls or carried therealong, a series of bars interspersed between the rolls of less length than the rolls having their ends in alignment and together constituting a cracking off table, a carriage to which the bars are attached mounted for movement transversely of the runway, a framework on which the carriage is mounted, and means for moving the framework vertically so that in one position the tops of the bars lie below the level of the tops of the rolls, and so that in another position the tops of the bars lie above the level of the tops of the rolls.

WILLIAM OWEN.